(12) United States Patent
Egberts

(10) Patent No.: US 6,415,221 B1
(45) Date of Patent: Jul. 2, 2002

(54) METHOD FOR NAVIGATING A VEHICLE UTILIZING MAP DATA

(75) Inventor: Egbert Egberts, Eindhoven (NL)

(73) Assignee: Mannesmann VDO AG, Frankfurt am Main (DE)

(*) Notice: Subject to any disclaimer, the term of this patent is extended or adjusted under 35 U.S.C. 154(b) by 0 days.

(21) Appl. No.: 09/651,507

(22) Filed: Aug. 30, 2000

(30) Foreign Application Priority Data

Sep. 21, 1999 (DE) .......................... 199 45 123

(51) Int. Cl.[7] ............................... G01C 21/00
(52) U.S. Cl. ........................ 701/208; 701/224
(58) Field of Search .................. 701/208, 200, 701/210, 224, 220, 217

(56) References Cited

U.S. PATENT DOCUMENTS

| | | | | |
|---|---|---|---|---|
| 5,115,238 A | * | 5/1992 | Shimizu et al. ............. | 340/988 |
| 5,359,529 A | * | 10/1994 | Snider ......................... | 364/449 |
| 5,488,559 A | * | 1/1996 | Seymour ..................... | 364/449 |
| 5,839,087 A | * | 11/1998 | Sato ............................ | 701/207 |
| 5,852,791 A | * | 12/1998 | Sato et al. .................. | 701/217 |
| 5,906,653 A | * | 5/1999 | Ichimura et al. ............ | 701/207 |
| 6,002,981 A | * | 12/1999 | Kreft .......................... | 701/210 |
| 6,023,653 A | * | 2/2000 | Ichimura et al. ............ | 701/208 |

* cited by examiner

Primary Examiner—Michael J. Zanelli
(74) Attorney, Agent, or Firm—Mayer, Brown, Rowe & Maw

(57) ABSTRACT

The invention specifies a method for navigating a vehicle, in which at least one sensor is used to ascertain a vector for a distance covered from direction and length, a plurality of vectors are used to determine a position of the vehicle, and the position is depicted on a map position, where, under prescribed conditions, the direction ascertained by the sensor is corrected using a direction ascertained on the basis of the map. The aim of this is to be able to improve continuous position determination. To this end, if a direction difference arises between the sensor and the map, the direction difference, or the variables on which it is based, are subjected to a plausibility check.

20 Claims, 1 Drawing Sheet

METHOD FOR NAVIGATING A VEHICLE UTILIZING MAP DATA

BACKGROUND OF THE INVENTION

The invention relates to a method for navigating a vehicle, in which sensors are used to ascertain a vector for a distance covered from direction and length, a plurality of vectors are used to determine a position of the vehicle, and the position is depicted on a map position, where, under prescribed conditions, the direction ascertained by the sensor is corrected using a direction ascertained on the basis of the map.

DESCRIPTION OF RELATED ART

Navigation in which the current position of the vehicle is determined by continuously ascertaining the direction and magnitude of a movement starting from a starting point is also called "compound navigation" or dead reckoning. Provided that the direction and the distance covered in this direction can be determined relatively accurately, relatively accurate position determination is also obtained. If such position determination is carried out at a frequency of 5 Hz, then the individual vectors, i.e. the sections of road whose direction and length are being determined, with an order of magnitude in the meter range are small enough to enable virtually continuous position determination to be performed.

However, the sensors required to determine the direction and distance predominantly operate with a certain degree of error. This is particularly valid for the direction sensors, which are predominantly in the form of gyroscopes today. A gyroscope outputs an output signal, called drift, with a DC voltage at a predetermined level so long as the vehicle is moving in a straight line. When the direction of the vehicle changes to the left or to the right, the voltage rises or falls on the basis of the angular speed during the change. By integrating this signal over time, it is possible to ascertain the angle of the direction change.

However, since gyroscopes normally have a drift error, it is entirely possible that the navigation system will assume a direction change even though no direction change has actually taken place. In the same way, an incorrect angle can be ascertained for a direction change.

To remedy this problem, a control option is used. This involves tracing the path of a vehicle on a map. In this case, the map is stored in a database or in another suitable data format. In this context, it is assumed that the vehicle is situated on a road if such a road is situated close to the position determined by compound navigation. Such a procedure is also called map matching, and the part of the navigation system which carries out this depiction is called the map matcher.

By combining compound navigation with the control using the map positions, relatively high degrees of accuracy are achieved when determining the position of the vehicle. Added to this is the fact that the series of positions determined on the map can be used to draw conclusions as to whether the direction sensor is operating with the required degree of reliability, for example. Furthermore, when the direction of the vehicle on the map has been determined, this direction can be used to determine the next vector. Such resetting of the vehicle direction to the value obtained by map positioning is carried out, for example, whenever at least 3 sec. have elapsed since the last direction change.

However, this procedure has the disadvantage that resetting to the direction ascertained using the map can create a new error which, under some circumstances, significantly impairs the positioning result.

SUMMARY OF THE INVENTION

The invention is based on the object of improving continuous position determination.

This object is achieved for a method of the type mentioned in the Background of the Invention section above by virtue of the feature that, if a direction difference arises between the sensor and the map, the direction difference or the variables on which it is based are subjected to a plausibility check.

In this case, it is first assumed that there is no need for correction if there is a match between the direction determined by the sensor and the direction determined using the map. If such a direction difference has arisen, then there appears to be a need for correction. In this case, however, the new direction used for compound navigation is not merely set equal to the direction which has been ascertained using the map, but rather a check is first carried out to determine whether it is at all possible that the vehicle has taken this direction. If appropriate, a check is carried out to determine whether there is a particular degree of probability of this. Only if this condition is satisfied is the correction made.

One preferred procedure for the plausibility check is that a possible maximum error is estimated and a correction is then not made if the estimated maximum error is smaller than the direction difference. In this context, it is first assumed that the error can primarily be attributed to the error of the direction sensor. In this case, it is then possible to estimate the maximum possible level of this error. If the direction difference is still greater than this maximum error, then there is a high degree of probability that the error has not or has not only been caused by the direction sensor, but rather the depiction on the map is possibly erroneous.

The maximum error is preferably formed by a product comprising an error value and the time since the last correction, possibly plus an estimated error value comprising the last direction correction. As mentioned above, the direction sensor outputs a signal which deviates from a prescribed mean value if and so long as the vehicle is executing a direction change. In the event of an error, the signal deviates from the mean value by the error value even when the vehicle is not executing a direction change, but rather is traveling in a straight line. The maximum error can then be no larger than the integral of this error value over time, and possibly of an initial error which may have arisen during the last correction and can be prescribed as an estimate value, for example. If the direction difference is greater, then the error does not or does not just lie with the direction sensor. In this case, a correction must not be made.

The error value is preferably ascertained from previous corrections. The result of this is dynamic matching of the error value. In this context, allowances can be made, for example, for the fact that the error value changes over time, for example on account of changing operating conditions. Many direction sensors have a certain degree of temperature dependency.

Preferably, the error value is filtered. This allows the error value to be ascertained even more effectively. Since, under some circumstances, direction determination using the map may likewise have errors from time to time, such "outliers" have only a reduced influence on the error value actually used later.

It is also advantageous if the map is searched for alternatives for which the direction difference is smaller. In many cases, the error arises simply as a result of the map matcher accessing an incorrect database sector. When "map" is mentioned in this context, this always refers to the form stored in the form of data records or database sectors. When an incorrect database sector is accessed and an error is produced as a result, it is possible to look in adjacent database sectors to determine whether a better match can possibly be found there. Adjacent database sectors are those containing coordinate ranges which are adjacent to one another in reality. The sectors themselves need not be adjacent in physical or address terms.

DETAILED DESCRIPTION OF PREFERRED EMBODIMENTS

The invention is described below in conjunction with the drawing, in which.

Figure 1:
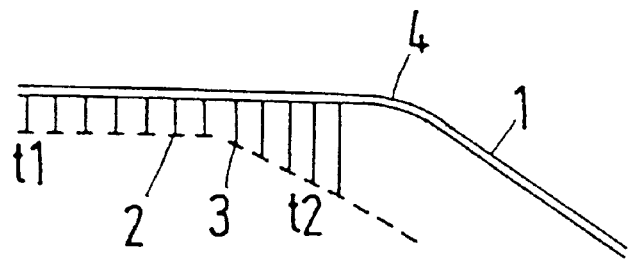
FIG. 1 shows a first instance for a plausibility check.

All three figures show a road 1 on which a vehicle (not shown in more detail) is moving. On the one hand, the road 1 exists in reality, i.e. on the surface of the earth. On the other hand, it exists virtually as a system of coordinates which are stored in a database, for example. These are used to reproduce the position of the vehicle.

A dashed line shows a profile 2 of positions 3 ascertained by a navigation system (likewise not shown in more detail) using compound navigation or a method called dead reckoning. In this context, the dashes in the dashed profile 2 are intended to indicate vectors ascertained, for example, at a frequency of 5 Hz from a direction in which the vehicle is traveling and a distance covered by the vehicle in the interval concerned. The vehicle contains sensors both for determining the direction and for measuring the distance. The direction sensor is formed by a gyroscope, for example. At a speed of 50 km/h, the length of a vector is approximately 2.8 m.

Now, each time a vector is determined, map matching can be performed, that is to say it is possible to ascertain the corresponding database sector containing the coordinates which are closest to the position 3 determined by compound navigation and have the best match in terms of direction. When such a condition has been satisfied, the map matcher, that is to say the part of the navigation system depicting the vehicle on the virtual road, switches over to the "on road" state. In this case, it is assumed that the vehicle is situated on the road. The direction of the road, which can be determined relatively accurately on the basis of the stored map, is in this case checked to determine whether it matches the direction of the vector. Matching can now be carried out from time to time. The conditions for this are, for example, that the depictions on the database are valid for at least 40 m and at least 3 sec. It is also possible to evaluate statistics, i.e. to perform linear regression of differences between the individual directions ascertained by compound navigation and database directions over time, and to ascertain the standard deviation. If the standard deviation ascertained is different, in particular greater, than the standard deviation of the gyroscope, then no correction is carried out. In this case, it is assumed that the vehicle has not traveled in a straight line. If a correction is made, then the direction for compound navigation is set to the value resulting from the map. This correction will also, as stated, be restricted to the vehicle not having taken a bend, so that the direction correction is made only when the vehicle is traveling in a straight line. The vehicle's traveling in a straight line can also be ascertained in another manner.

The control becomes particularly reliable when all three conditions are satisfied, namely traveling in a straight line, valid depiction and small standard deviation.

The drawing now shows a few problem instances which may arise for this method.

FIG. 1 shows a situation in which, although the profile 2 inherently matches the profile of the road 1, compound navigation results in a lag behind the profile of the road, which means that there is suddenly a relatively large error at a bend 4. When matching to the virtual map, an incorrect data sector is used in this case.

Thus, if the direction has been corrected for compound navigation at the instant t1, then the direction is still correct at this instant. At the instant t2, however, a correction would be made for "travel in a straight line", which would result in the position determination being impaired.

A plausibility check is therefore carried out before a correction is made at instant t2.

In the situation shown in FIG. 1, the direction sensor indicates that the vehicle has taken a bend. The direction ascertained by comparison with the map would be straight on. A check is now carried out to determine whether the direction ascertained using the map is at all possible. To this end, the direction sensor is allowed a certain degree of error, for example 0.05°/sec. This error can be ascertained from previous corrections. If, for example, the direction needed to be corrected by 0.5° after 10 sec. in the past, then the magnitude of error can be entirely assumed to be 0.05°/sec. The individual error values ascertained for corrections may also be filtered to obtain greater uniformity.

In the instance shown in FIG. 1, a period of 15 sec. has elapsed between t1 and t2. This would enable an error of 0.75° plus, if appropriate, an estimated initial error of, for example, 2° from the last correction, i.e. 2.75° together. However, the actual discrepancy between the map direction and the compound navigation direction is 15°. In this case, it is not possible for the error to be attributable exclusively to the compound navigation, and a correction is not carried out.

Figure 2:
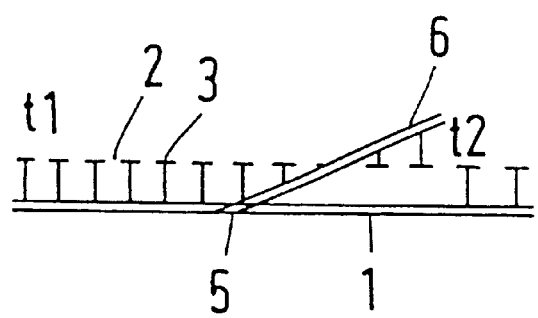
FIG. 2 shows a second instance for a plausibility check.

FIG. 2 shows another situation. The profile 2 of the positions 3 determined by compound navigation runs at the side of and parallel to the road 1. A minor road 6 forks off at a junction 5, specifically in the direction where the profile 2 is also situated. Accordingly, the gap between the positions 3 and the road 6 becomes smaller, with the result that the map matcher assumes that the vehicle is no longer situated on the road 1, but has turned off onto the road 6 instead. If the compound navigation direction were now to be matched to the road direction at the instant t2, the direction would likewise need to be changed by approximately 15° again, even though the direction sensor has in principle indicated that the vehicle has traveled straight on. The correction would not be made in such a case either, because the direction difference between the map and compound navigation is greater than an error which can be formed as a result of integrating the largest direction sensor error.

Once the map matcher has established that the vehicle is not situated on the road 6, it returns to the road 1 and checks whether better values are produced if it assumes that the vehicle is following this road 1. In this case, the direction can be corrected to the road 1 again.

Figure 3:
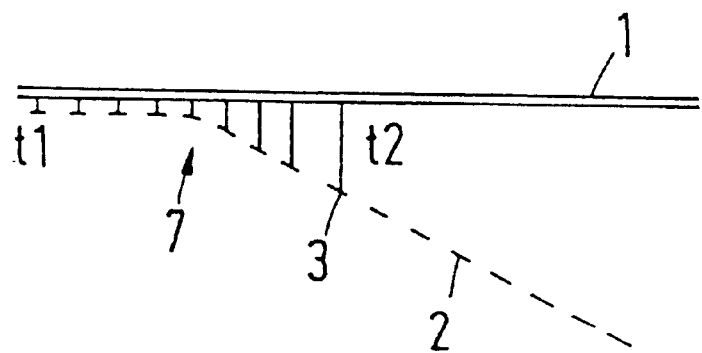
FIG. 3 shows a third instance.

FIG. 3 shows a situation where the profile 2 is again following the road 1, so that a direction correction is possible at the instant t1.

The vehicle then turns off from the road 1, however, specifically onto a road which is not stored in the database.

For this reason, it is also not shown. The map matcher then tries to correct the position of the vehicle to the road 1 up to the instant t2. Since, however, a constant increase in the gap is observed and this constant increase cannot be explained merely by an error of the direction sensor, the map matcher switches to "off road" at instant t2, so that no correction to a map direction is subsequently made.

What is claimed is:

1. A method for navigating a vehicle, in which:

at least one sensor is used to ascertain a vector for a distance covered from direction and length;

a plurality of vectors is used to determine a position of the vehicle;

the position is depicted on a map in a first map position; and where, under prescribed conditions, the direction ascertained by the sensor is corrected using a direction ascertained on the basis of the map, wherein, if a first direction difference arises between the sensor and the map, the first direction difference, or at least one of a plurality of variables on which the first direction difference is based, is subjected to a plausibility check, wherein the plausibility check is based on at least one of the variables on which the first direction difference is based.

2. The method as claimed in claim 1, wherein a possible maximum error is estimated and a correction is then not made if the estimated maximum error is smaller than the direction difference.

3. The method as claimed in claim 2, wherein the possible maximum error is formed by a product comprising an error value and a time since a last correction, and may include an estimated error value comprising the last correction.

4. The method as claimed in claim 2, wherein the map is searched for at least one alternative map position for which a second direction difference is smaller than the first direction difference.

5. The method as claimed in claim 3, wherein the error value is ascertained from previous corrections.

6. The method as claimed in claim 3, wherein the map is searched for at least one alternative map position for which a second direction difference is smaller than the first direction difference.

7. The method as claimed in claim 5, wherein the error value is filtered.

8. The method as claimed in claim 5, wherein the map is searched for at least one alternative map position for which a second direction difference is smaller than the first direction difference.

9. The method as claimed in claim 7, wherein the map is searched for at least one alternative map position for which a second direction difference is smaller than the first direction difference.

10. The method as claimed in claim 1, wherein the map is searched for at least one alternative map position for which a second direction difference is smaller than the first direction difference.

11. A method for navigating a vehicle, in which:

at least one sensor is used to ascertain a vector for a distance covered from direction and length;

a plurality of vectors is used to determine a position of the vehicle;

the position is depicted on a map in a first map position; and where, under prescribed conditions, the direction ascertained by the sensor is corrected using a direction ascertained on the basis of the map, wherein, if a first direction difference arises between the sensor and the map, the first direction difference, or at least one of a plurality of variables on which the first direction difference is based, is subjected to a plausibility check to determine whether the first direction difference may be due to an error attributable to the sensor.

12. The method as claimed in claim 11, wherein a possible maximum error is estimated creating an estimated maximum error and a correction is then not made if the first estimated maximum error is smaller than the direction difference.

13. The method as claimed in claim 12, wherein the estimated maximum error is formed by a product comprising an error value and a time since a last correction, and may include an estimated error value comprising the last correction.

14. The method as claimed in claim 12, wherein the map is searched for at least one alternative map position for which a second direction difference is smaller than the first direction difference.

15. The method as claimed in claim 13, wherein the estimated error value is ascertained from previous corrections.

16. The method as claimed in claim 13, wherein the map is searched for at least one alternative map position for which a second direction difference is smaller than the first direction difference.

17. The method as claimed in claim 15, wherein the estimated error value is filtered.

18. The method as claimed in claim 15, wherein the map is searched for at least one alternative map position for which a second direction difference is smaller than the first direction difference.

19. The method as claimed in claim 17, wherein the map is searched for at least one alternative map position for which a second direction difference is smaller than the first direction difference.

20. The method as claimed in claim 11, wherein the map is searched for at least one alternative map position for which a second direction difference is smaller than the first direction difference.

* * * * *